United States Patent
Blizzard

(10) Patent No.: US 10,543,472 B2
(45) Date of Patent: Jan. 28, 2020

(54) METHOD OF ENCAPSULATING PARTICULATE MATERIAL

(71) Applicant: John D. Blizzard, Bay City, MI (US)

(72) Inventor: John D. Blizzard, Bay City, MI (US)

( * ) Notice: Subject to any disclaimer, the term of this patent is extended or adjusted under 35 U.S.C. 154(b) by 258 days.

(21) Appl. No.: 15/080,698

(22) Filed: Mar. 25, 2016

(65) Prior Publication Data

US 2016/0207021 A1 Jul. 21, 2016

Related U.S. Application Data

(62) Division of application No. 12/930,070, filed on Dec. 24, 2010, now abandoned.

(60) Provisional application No. 61/284,818, filed on Dec. 24, 2009.

(51) Int. Cl.
*B01J 13/22* (2006.01)
*B01J 13/06* (2006.01)

(52) U.S. Cl.
CPC .............. *B01J 13/22* (2013.01); *B01J 13/06* (2013.01); *Y10T 428/2989* (2015.01)

(58) Field of Classification Search
None
See application file for complete search history.

(56) References Cited

U.S. PATENT DOCUMENTS

| | | | | |
|---|---|---|---|---|
| 5,989,767 A | * | 11/1999 | Yoerger | G03G 9/1139 430/111.32 |
| 6,337,089 B1 | * | 1/2002 | Yoshioka | A61K 8/11 424/400 |
| 6,447,907 B1 | * | 9/2002 | Wolter | A61K 6/0008 428/402 |
| 2011/0159289 A1 | * | 6/2011 | Blizzard | B01J 13/18 428/402.24 |

* cited by examiner

*Primary Examiner* — Jeffrey D Washville

(57) ABSTRACT

A method of encapsulating particulate materials that enables the particulate materials to be used in end use applications where they currently are not useful. The method uses specific sol gel technology to encapsulate solid particles. In addition, the method can be used to multiple coat a coated particle.

5 Claims, No Drawings

METHOD OF ENCAPSULATING PARTICULATE MATERIAL

This application is a continuation-in-part of U.S. Utility patent application Ser. No. 12/930,070, filed Dec. 24, 2010, now abandoned, which was filed from U.S. Provisional application Ser. No. 61/284,818, filed Dec. 24, 2009, from which priority is claimed.

The invention disclosed and claimed herein deals with a method of encapsulating particulate materials that enables the particulate materials to be used in end use applications where they currently are not useful.

BACKGROUND OF THE INVENTION

Encapsulation of particulate and liquid materials has been known for a number of years. Such materials most usually encapsulated are fragrances, shampoos, cosmetics, colorants, catalysts, laundry detergents and soaps, personal care products, textiles, active ingredients, auto care products, and the like.

THE INVENTION

The invention disclosed and claimed herein is a method of encapsulating particulate materials. The method comprises providing acidified water at least sufficient for hydrolyzing a predetermined amount of alkoxysilane.

Then, at least one type of particulate material is dispersed in the acidified water and there is slowly added a predetermined amount of alkoxysilane having the general formula:

$$R_xSi(OR)_{4-x}.$$

wherein the substituents are selected from the group consisting of fluorine, amino, hydroxy, and combinations thereof.

Thereafter, sufficient time is allowed for the alkoxysilane to hydrolyze and build a predetermined particle size and then the dispersion is optionally neutralized with a base.

Subsequent steps include the work up of the product. It is best if larger amounts of water are used during the sol gel formation to prevent gelation of the sol gel, care being taken to minimize the amount of water as the excess water must be removed from the reaction mass at the end of the reaction. Any solids in the dispersion are dried. The dry solids can be ground to a fine powder for use.

DETAILED DESCRIPTION OF THE INVENTION

It should be noted at the outset, that the encapsulation method of this invention does not rely on or use cross linkers, catalysts, surfactants and any other adjuvants that are expressly stated in the prior art to facilitate other means and methods of encapsulation of particulate material.

It should be further noted that the encapsulation reaction is run at or near room temperature and therefore, there is no need for any heating or cooling equipment.

The reaction of this invention can be run in less than twenty-four hours and preferred is a reaction time of less than 10 hours, and a most preferred time is a reaction time of less than 3 hours.

There is a requirement that the stoichiometry be observed between the amount of water in the reaction system and the amount of alkoxysilane in the system in order to carefully control the condensation reaction of the sol get that is being formed, to achieve the desired results.

It is best if the alkoxysilane is added in small portions, that is, "slowly". Introducing the alkoxysilane too quickly will result in adverse results, i.e. gelation of the reaction mass.

Adding the alkoxysilane in smaller portions will allow the sol gel to build to the appropriate particle size. This is a critical step in the method as a particle size too small will not encapsulate the particle and a particle size too large will cause premature precipitation and gelling. Defining the size of the particle can be determined by watching the reaction medium. Building of the particle can be observed and thus if the alkoxysilane is added too slowly, no particles other than the particle to be encapsulated will be visible while elements of gelling can be observed if the addition is too rapid. As long as one observes the reaction carefully, slight amounts of these two conditions can be remedied by adjustment of the addition rate either more or less.

The condensation reaction can be represented by the following chemical equation:

$$R_xSi(OR')_{4-x} + H_2O + H + R_xSi(OH)_y + R'OH$$

wherein R is an alkyl group, a substituted alkyl group, an aryl group, a substituted aryl group, vinyl, allyl or hydrogen. Alkyl groups are those such as methyl, ethyl, propyl, amyl, etc. Aryl groups are selected from phenyl and tolyl. Substituted groups are selected from the group consisting of fluorine, amino groups, hydroxy groups, and combinations thereof. R' is selected from hydrogen and alkyl groups of 1 to 4 carbon atoms.

The reaction mass is subjected to mild temperatures to remove the water and dry the sample, such as 50° C. or lower, although this temperature is not overly critical. One should take caution not to melt the encapsulated particle.

If one wishes to use the encapsulated particles in a end use formulation that uses water as part of the formulation, it may not be necessary to remove the water, or it may be necessary to remove some of the water but not dry out the sample completely.

Thereafter, the dried sample can be subjected to grinding to reduce the size of the particles. The size of the ground particle is dependent on the users end use, however, it has been found that grinding the encapsulated particles to the size of table salt is the most useful, producing a flowable product.

In an effort to minimize the amount of water used in the method, one must determine the solubility of the particulate solid in water (Ksp).

It is also contemplated within the scope of this invention to perform an encapsulation on an encapsulated material of this invention to produce an added-to coating, much like producing an onion.

EXAMPLES

Various metal salt solid particles were encapsulated by the method of this invention in the following manner by first determining their Ksp. (TABLE I)

TABLE I

| Metal Salt | Ksp |
|---|---|
| Potassium chloride (KCl) | total solubility |
| Copper Chloride (CuCl₂) | 70.6 gm/100 ml |
| Lithium Chloride (LiCl) | 76.9 gm/100 ml |
| Barium Chloride (BaCl₂) | 31 gm/100 ml |
| Zinc Chloride (ZnCl₂) | 81 gm/100 ml |

It is necessary to determine the solubility constant (Ksp) of each of the metallic particles, as a stoichiometric amount of water is required to properly form the sol gel and the water is also necessary to dissociate the metallic salt in the mixture. Further, it is unknown what effect the free chloride from the dissociation of the metallic salt will have on the sol gel formation.

Example 1

Potassium chloride was dissolve in acidified water. Thereafter, methyltrimethoxysilane was slowly added to allow for the hydrolysis of the alkoxy silane. The methyltrimethoxysilane was added in two equal portions to allow the sol gel to build to the appropriate particle size. After the reaction, the sol gel was neutralized to cause the precipitation of the matrix. The sample was oven dried at 45° C. overnight to remove the water followed by grinding the resulting metallic salt sol gel to a powder about the size of table salt.

Example 2

To a 200 ml beaker, 35 grams of distilled water was added. To this water, 8 grams of lithium chloride was added with agitation. The temperature of the distilled water was measured at 23° C. During dissociation of the lithium chloride the temperature rose to 60 degrees, an exotherm of 37 degrees centigrade. After cooling back to 23 degrees, 2.3 grams of Dow Corning 6070 silane (methyltrimethoxysilane—Dow Corning Corporation, Midland, Mich.) was added drop wise and allowed to mix and hydrolyze. After continuous mixing for 60 minutes, 2.3 grams of Dow Corning 6070 silane was added drop wise and allowed to mix for 120 minutes. The resulting reaction product was filtered through filter paper to collect the encapsulated metal salt. This was dried for 16 hours at 45° C. resulting in a white crystalline powder. This powder was placed in a porcelain crucible and ground to a fine white powder about the size of table salt.

Thereafter, each of the sol gel versions of the salts set forth in TABLE I were produced by virtually the same procedure. The results can be found in TABLE II.

TABLE II

| SAMPLE # | 1 | 2 | 3 | 4 | 5 | Solubility |
|---|---|---|---|---|---|---|
| WATER | 35 | 35 | 35 | 35 | 35 | |
| POTASSIUM | 8 | | | | | INFINITE |
| COPPER | | 8 | | | | 70.6/100 ML |
| Lithium | | | 8 | | | 76.9/100 ml |
| Barium | | | | 8 | | 31/100 ml |
| Zinc | | | | | 8 | 81/100 ml |
| MTM[1] | 2.3 | 2.3 | 2.3 | 2.3 | 2.3 | |
| MTM[2] | 2.3 | 2.3 | 2.3 | 2.3 | 2.3 | |
| NaOH | 1.2 | 1.2 | 0 | 1.2 | 0 | |
| Product | 3 gms | 3 gms | | 3 gms | | |
| Water | 15 gms | 15 gms | | 15 gms | | |
| Dry weight | 0.46 g | 0.61 g | | 0.26 g | | |

[1]first addition of methyltrimethoxysilane
[2]second addition of methyltrimethoxysilane

TABLE III

Table III shows additdonal reactions.

| | 1 | 2 | 3 | 4 | 5 |
|---|---|---|---|---|---|
| WATER | 175 | 175 | 175 | 175 | 175 |
| K | 40 | | | | |
| CU | | 40 | | | |
| LI | | | 40 | | |
| BA | | | | 40 | |
| ZN | | | | | 40 |
| RXN[1] | ENDO | EXO | EXO | ENDO | EXO |
| MTM | 11.5 | 11.5 | 11.5 | 11.5 | 11.5 |
| MTM | 11.5 | 11.5 | 11.5 | 11.5 | 11.5 |
| NaOH | 6 | 6 | 6 | 6 | 6 |
| Solution Color | OPAQUE | BLUE/GREEN | OPAQUE | OPAQUE | OPAQUE |
| Exotherm Temperature ° C. | | 40 | 60 | 17 | |

Table IV has additional reaction data demonstrating a reduction in the amount of water required for the sol-gel formation.

TABLE IV

| | 1 | 2 | 3 |
|---|---|---|---|
| WATER | 35 | 35 | 35 |
| Cu | | 28 | |
| Li | 30.4 | | |
| Ba | | | 11.7 |
| MTM | 8.7 | 8.7 | 8.7 |
| MTM | 8.7 | 8.7 | 8.7 |
| EXO TEMP. ° C. | 60 | 40 | 17 |
| SOLN pH | | 2 | 6 |

Table V has additional data showing the double coating technique. The encapsulated material from experiment 1 of table V was used herein. The water and lithium chloride was allowed to equilibrate and a sample of the final product was added to this mixture. The product from experiment 1 of table IV was not soluble in the water solution. However, upon the addition of the first quantity of methyltrimethoxysilane, the material was able to go into solution. The second addition of methyl trimethoxysilane completed the final encapsulation product.

TABLE V

| | 1 |
|---|---|
| WATER | 17.5 |
| Li | 15.7 |
| MTM | 4.35 |
| MTM | 4.35 |

TABLE V-continued

|  | 1 |
|---|---|
| SAMPLE 1 FROM TABLE V | 5.0 |
| EXO TEMP ° C. | 67 |
| SOLUTION pH | 4 |

What is claimed is:

1. A method of encapsulating particulate materials the method consisting of:
   a. providing acidified water at least sufficient for hydrolyzing a predetermined amount of alkoxysilane;
   b. thereafter dispersing at least one type of particulate material in the acidified water;
   c. thereafter slowly adding a predetermined amount of alkoxysilane having the general formula:

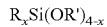

wherein R is selected from the group consisting essentially of alkyl groups, substituted alkyl groups, aryl groups, substituted aryl groups, vinyl, allyl, and hydrogen, wherein the substituents are selected from the group consisting of fluorine, amino, hydroxy, and combinations thereof, and wherein R' is selected from hydrogen and alkyl groups of 1 to 4 carbon atoms;
   d. thereafter allowing sufficient time for the alkoxysilane to hydrolyze and build a predetermined particle size.

2. The method as claimed in claim 1 wherein, in addition, there is a step e. in which the product of d. is neutralized with base.

3. The method as claimed in claim 1 wherein, in addition, the water is removed from the dispersion and any solids in the dispersion are dried.

4. The method as claimed in claim 2 wherein, in addition, the dry solids are ground to a fine powder.

5. An encapsulated particulate material prepared by the method of claim 1.

* * * * *

UNITED STATES PATENT AND TRADEMARK OFFICE
CERTIFICATE OF CORRECTION

PATENT NO. : 10,543,472 B2
APPLICATION NO. : 15/080698
DATED : January 28, 2020
INVENTOR(S) : John D. Blizzard Page 1 of 1

It is certified that error appears in the above-identified patent and that said Letters Patent is hereby corrected as shown below:

In the Claims

Claim 4: replace the wording "in claim 2" at Column 6, Line 15 with the wording "in claim 3".

Signed and Sealed this
Seventh Day of April, 2020

Andrei Iancu
*Director of the United States Patent and Trademark Office*